March 4, 1930.　　　　W. A. CHRYST　　　　1,749,322

UNIVERSAL JOINT

Filed July 16, 1928

Inventor
William A. Chryst
By Spear Hardman & Fehr
His Attorneys

Patented Mar. 4, 1930

1,749,322

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

UNIVERSAL JOINT

Application filed July 16, 1928. Serial No. 293,168.

This invention relates to a non-metallic pivot joint connecting two rigid members.

An object of this invention is to provide an improved form of pivot shackle having resilient non-metallic material therein which provides for all relative movement between the connected parts by internal distortion within the resilient material, whereby looseness, rattle, wear, and necessity for lubrication are overcome.

Further objects and advantages of the present invention will be apparent from the following description, reference being had to the accompanying drawings, wherein a preferred form of embodiment of the present invention is clearly shown.

In the drawings.

Similar reference characters refer to similar parts throughout the several views.

Figure 1:
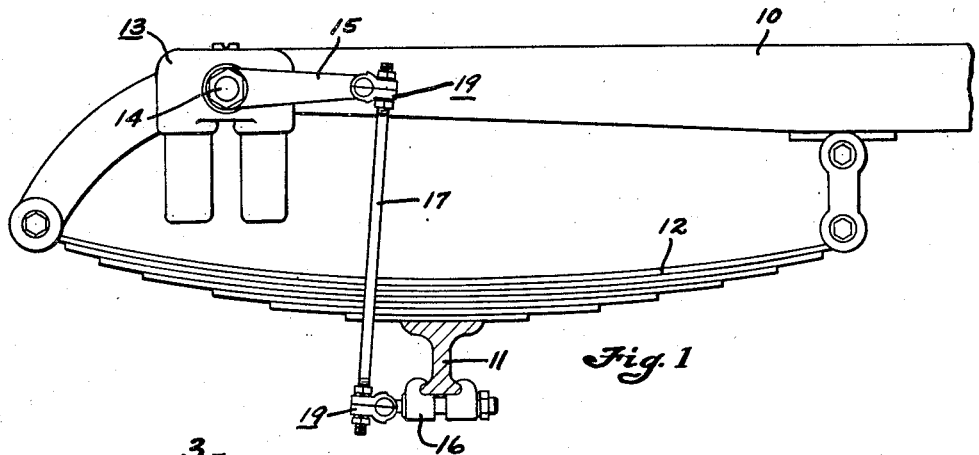
Fig. 1 is a diagrammatic view showing parts of the front end of an automobile chassis equipped with a hydraulic shock absorber, and also showing the thrust link connected to the shock absorber lever arm by the pivot joint of this invention.

In Fig. 1, 10 designates the front end of the chassis side rail, 11 the front axle, 12 the semi-elliptic leaf spring, and 13 a double cylinder hydraulic shock absorber unit which is rigidly fixed to frame 10. Unit 13 has a projecting rocker shaft 14 to which the swinging lever arm 15 is fixed. The outer end of arm 15 is pivoted to thrust link 17 by joint 19 while the lower end of link 17 is pivoted by a similar joint to the fitting 16 which is rigid with axle 11. Now when axle 11 moves up toward rail 10 when spring 12 is flexed, the link 17 will force lever arm 15 to rotate counterclockwise against the resistance of a hydraulic piston within unit 13. When axle 11 moves down, the link 17 is put under tension to rotate lever arm 15 in a clockwise direction against the resistance of a hydraulic piston in unit 13. The arrangement of parts so far described form no part of this invention and hence are not disclosed herein in greater detail, this invention relating to the improved form of joint 19 connecting link 17 to lever arm 15.

Figures 2, 3:
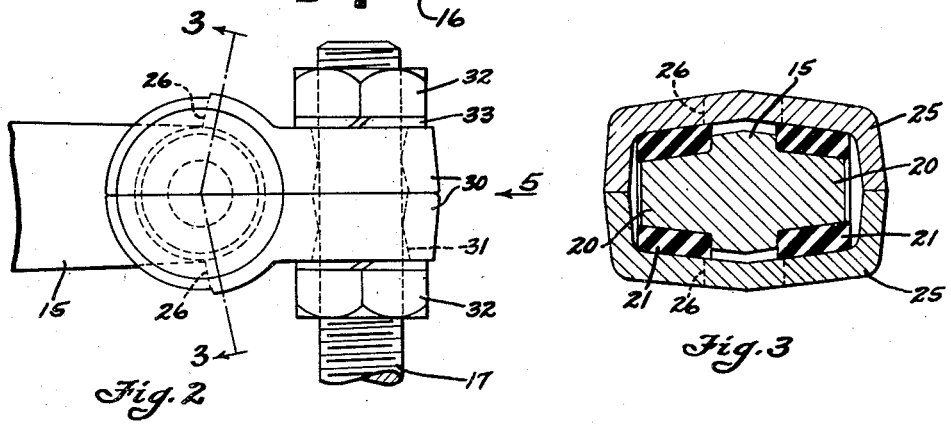
Fig. 2 is a side elevation on a larger scale of the pivot joint shown in Fig. 1.
Fig. 3 is a section on line 3—3 of Fig. 2.
Figure 4:
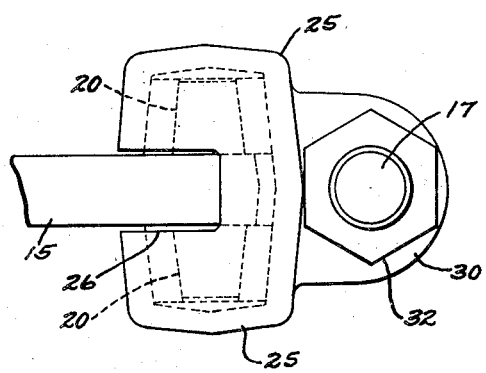
Fig. 4 is a top view of Fig. 2.
Figure 5:
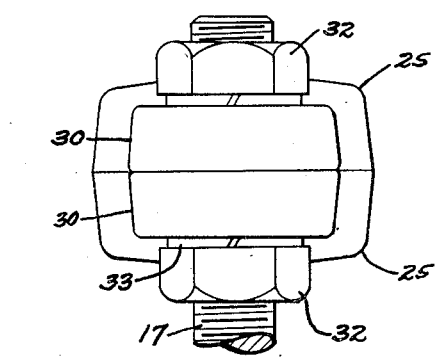
Fig. 5 is an end elevation looking in the direction of arrow 5 in Fig. 2.

The outer end of arm 15 has, preferably integral therewith, the two transverse oppositely tapered journals 20. Over each tapered journal 20 is telescoped a snugly fitting resilient soft rubber bushing 21 which preferably project slightly beyond the ends of journals 20 (see Fig. 3).

Two complementary half-housings 25 together form a housing which completely encloses the journals 20 and confines the rubber bushings 21 under a predetermined initial compression. The half-housings 25 are cut away to provide an opening 26 which provides clearance for the lever arm 15 to swing through the desired arc without contacting with the metal housing. It will now be clear that the rubber bushings 21 completely isolate lever arm 15 from the half housings 25.

Half-housings 25 have mutually aligned rearwardly projecting ears 30 having therethrough aperture 31 extending through same. The threaded upper portion of link 17 extends through hole 31, and the nuts 32 and lock washers 33 rigidly clamp the half-housings together and at the same time rigidly fix them to the link 17. The rubber bushings 21 are thus compressed with the desired initial compression. Such initial compression will cause the rubber to grip the contacting metal walls and so resist relative slipping between the rubber and metal parts. Hence pivotal movement at the joint 19 is accommodated by an internal distortion within bushings 21 and without any slipping of parts together. Hence all looseness, wear, and rattling between metal parts is entirely avoided and no lubrication of the joint is required.

The rubber bushings 21 are well protected by the metal housing 25, 25 from outside deteriorating influences such as mud, sunshine, oil, road tar, etc., and hence the life of the rubber is lengthened.

The joints 19 will obviously permit a slight universal movement between the parts connected thereby due to the compressibility of the quite thick rubber bushings 21. Such universal movement will be sufficient to accommodate the lateral or "side sway" movement between frame 10 and axle 12.

While the form of embodiment of the present invention as herein disclosed, constitutes a preferred form, it is to be understood that other forms might be adopted, all coming within the scope of the claims which follow.

What is claimed is as follows:

1. In combination, a swinging arm, a rigid link connected to said arm by a pivot joint, said joint comprising: opposed tapered transverse journals rigid with the arm end, a soft rubber bushing fitting snugly upon each of said tapered journals, two complementary half-housings together enclosing both of said journals and rubber bushings and confining said bushings under initial compression, said half-housings having aligned projecting ears having a hole extending through both ears, said link extending through said hole and having means thereon for rigidly clamping said half-housings together.

2. In combination, a swinging arm, a rigid link connected to said arm by a pivot joint, said joint comprising: opposed transverse journals projecting laterally from the tip end of said arm, a soft rubber bushing snugly fitting each journal, two complementary half-housings together forming an exterior housing enclosing said journals and bushings and having a central opening through which said arm passes freely without contact with said housing, said half-housings having aligned projecting ears with a hole therethrough, said link extending through said hole and having nuts threaded thereon on each side of said ears for rigidly clamping said half-housings upon said rubber bushings.

3. In combination, a swinging arm, a rigid link connected to said arm by a pivot joint, said joint comprising: opposed transverse journals projecting laterally from the tip end of said arm, a soft rubber bushing snugly fitting each journal, a divided housing enclosing said journals and bushings and having an arcuate opening for permitting relative pivoting of said arm therewith, said housing being isolated from said arm and journals by said rubber bushings, the separate parts of said divided housing having aligned ears thereon, and common means for clamping said housing parts upon said rubber bushings and also fixing said parts to said link.

In testimony whereof I hereto affix my signature.

WILLIAM A. CHRYST.